Figure 1:
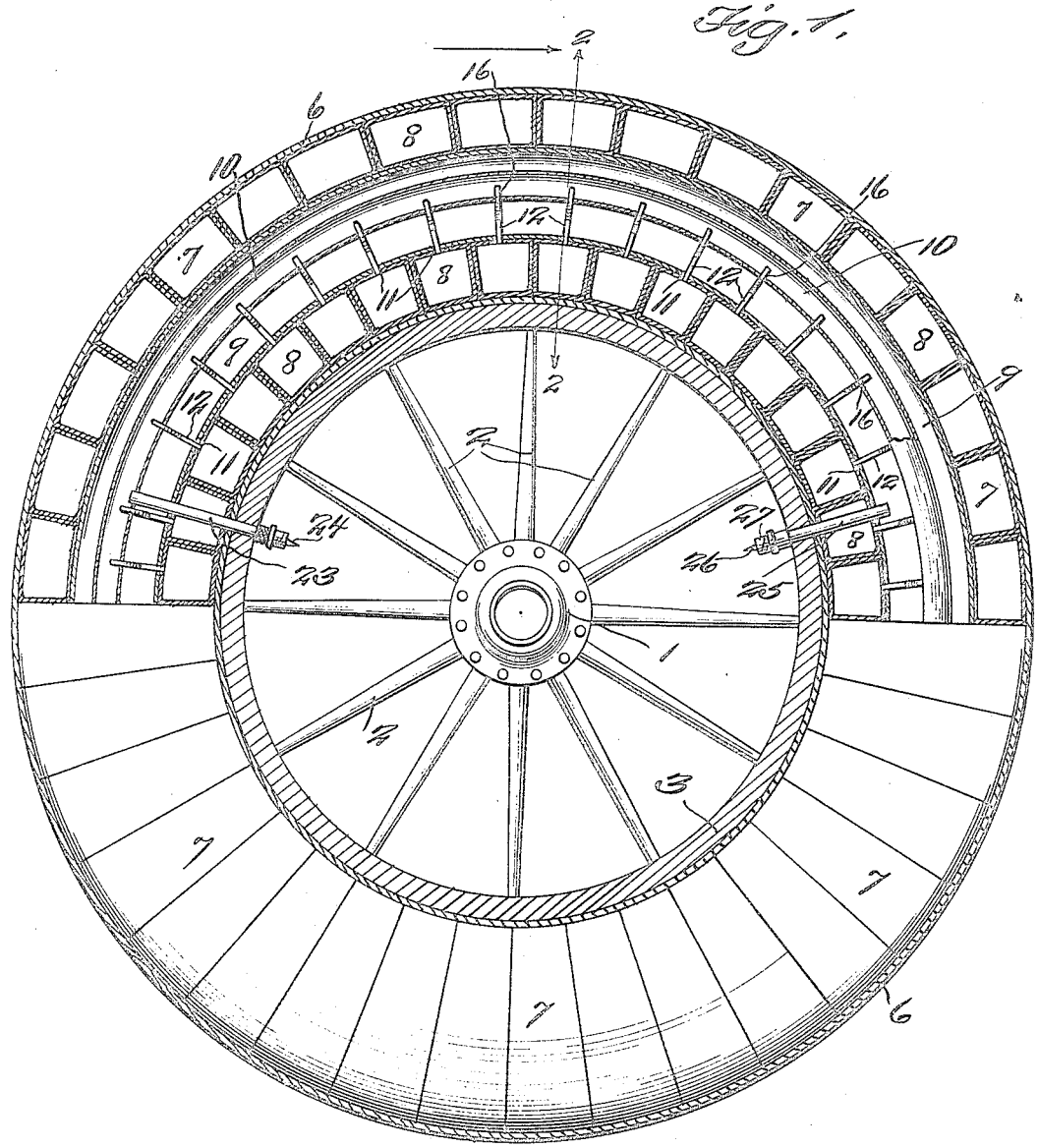

A. W. WASHBURN & C. D. KEELER.
RESILIENT TIRE.
APPLICATION FILED JAN. 17, 1912.
1,057,514.     Patented Apr. 1, 1913.
2 SHEETS—SHEET 2.
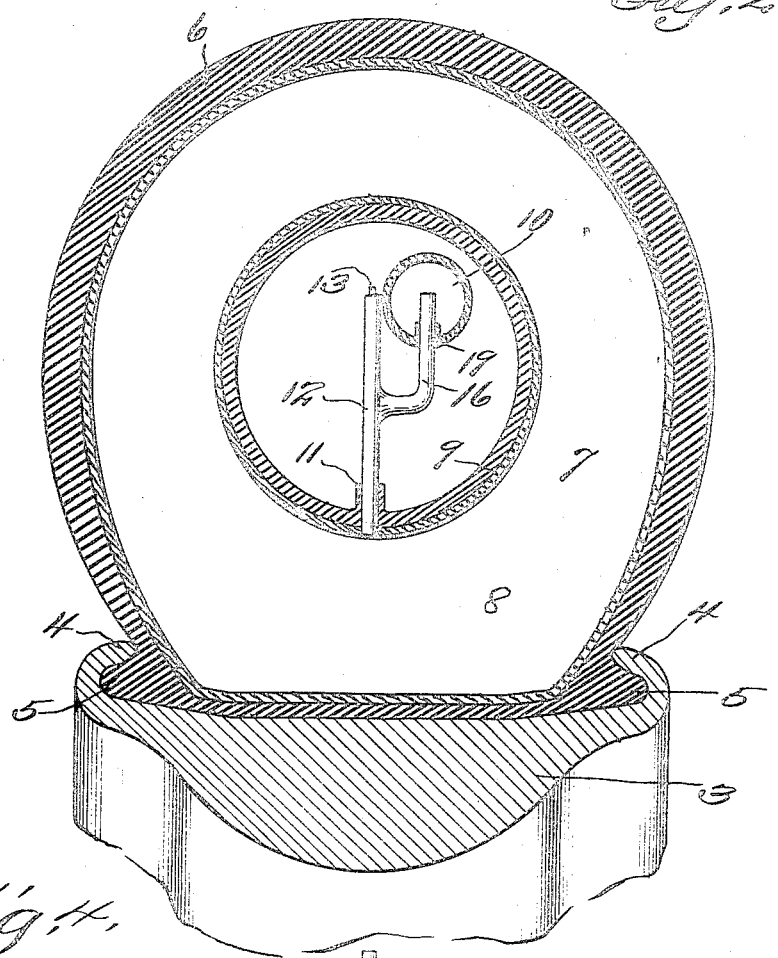
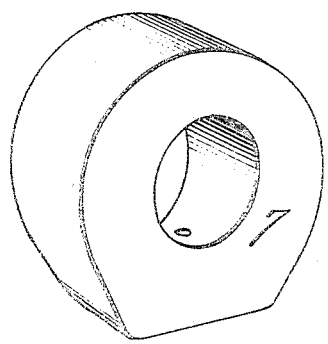
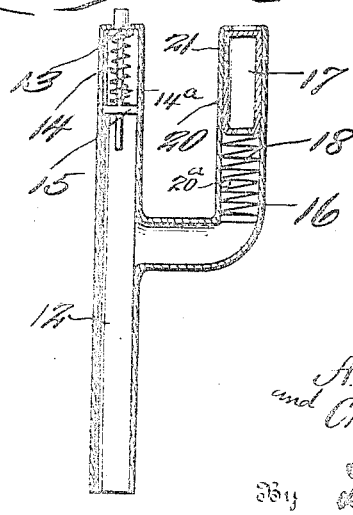
Witnesses
Inventors
A. W. Washburn
and Chas. D. Keeler,
By D. Swift
Attorney

UNITED STATES PATENT OFFICE.

ARTHUR W. WASHBURN AND CHARLES D. KEELER, OF MEMPHIS, TENNESSEE.

RESILIENT TIRE.

1,057,514.		Specification of Letters Patent.		Patented Apr. 1, 1913.

Application filed January 17, 1912. Serial No. 671,552.

*To all whom it may concern:*

Be it known that we, ARTHUR W. WASHBURN and CHARLES D. KEELER, citizens of the United States, residing at Memphis, in the county of Shelby and State of Tennessee, have invented a new and useful Resilient Tire; and we do hereby declare the following to be a full, clear, and exact description of the invention, such as will enable others skilled in the art to which it appertains to make and use the same.

This invention relates to a new and useful multiple chamber pneumatic automobile tire.

The principal object of the invention is to provide a tire of this nature having an outer shell shoe or casing having a plurality of soft rubber tubes arranged therein, in sequence, and at right angles to the travel of the vehicle. This plurality of tubes forms an elastic pneumatic cushion, for the reason that each tube provides an air containing compartment. Extending through the plurality of tubes is a central tube composed of exceedingly hard, strong, and puncture resisting substance, the same being barely flexible enough to conform easily to the shape of the wheel, and in which an innermost deflating tube, also composed of hard rubber substance, similar to that used in water hose or air tubes. By the provision of the central and innermost deflating tube, the plurality of tubes may be inflated or deflated.

The object for devising this structure, is to reduce the danger of stopping during an automobile tour. For instance if one or two of the plurality of tubes puncture, the other tubes may be expanded, thus taking the place of the lost air, practically making no other difference than to reduce the general pressure of the tire. In this manner the automobile tour or journey can be continued, and the punctured tubes repaired at leisure.

A further object for providing this plurality of tubes is to reduce the danger of a blow out of the complete tire. The loss of the air from one, two or three air containing compartments is so proportionately small, as to inflict little or no damage to the remainder of the tire.

The invention comprises further features and combination of parts, as hereinafter set forth, shown in the drawings and claimed.

In the drawings: Figure 1 is a view in side elevation, partly in section, of an automobile wheel having the improved tire thereon. Fig. 2 is a sectional view on an enlarged scale on line 2—2 of Fig. 1. Fig. 3 is a detail sectional view through one of the valved connections between the central tube and the innermost deflating tube. Fig. 4 is a detail view of one of the plurality of tubes.

Referring to the drawings 1 designates the hub of the wheel, while 2 denotes the spokes, whereas 3 designates the rim of the wheel. The rim 3 is of the usual construction having the overhanging flanges 4, which engage the flanges 5 of the outer protecting shoe or casing 6.

Arranged within the outer shell shoe or protecting casing is a plurality of tubes 7, arranged in sequence each providing component air containing compartment 8. Extending centrally through the tubes 7 is a central tube 9, which may be composed of any suitable very hard, strong and puncture resisting material, the flexibility of which being sufficient to permit the tube 9 to conform easily to the shape of the wheel. Arranged on the interior of the central tube 9 is a deflating tube 10, which also may be constructed of any suitable material.

Arranged on the interior of the central tube 9 and connected thereto in any suitable manner as shown at 11, by vulcanizing, and to communicate with the plurality of tubes, are valve tubes 12. In one end of each of the valve tubes 12 is a spring retained valve 13 the spring 14 of which acts between the bar 15, and the seat 13, to keep the same closed. Extending laterally of the valve tube 12 are additional branch valve tubes 16, in which the valve plungers 17 are mounted, so as to be held normally in the position shown in Fig. 3, by means of the springs 18, there being only one shown in Fig. 3. These additional casings are connected to the innermost deflating tube 10 by any suitable means and vulcanized, as at 19. Each of the additional branch valve tubes is provided with an opening 20, with which the opening 21 of the plunger valve 17 registers, when deflating the plurality of air containing tubes.

Extending through the rim 3 of the wheel and into the innermost deflating tube is a tube 23, having usual air operating valve 24, which is normally held closed. Also extending through the rim 3 is a tube 25 having a valve 26 of the usual construction, similar to the valve 24. This tube 25 extends into the central tube 9, as indicated in Fig. 1.

To inflate the plurality of air containing tubes, the usual form of pump (not shown) is connected to the tube 25 as at 27, after which air is pumped into the central tube 9. As the air enters the tube 9 it acts on each of the valves 13, sufficiently to open them, thus allowing the air to enter each and every tube 7. To deflate all the tubes 7, the pump is connected to the tube 23, so as to force air in the innermost tube 10, which will open each of the valve plungers 17, so that the openings 20 and 21 will register. When the openings 20 and 21 register the air in the plurality of tubes rushes through the valve tube 12, and thence through the additional tubes 16, from whence it leaves, and enters the central tube 9 through the openings 20 and 21, and thence to the atmosphere through the valve 26, which is adapted to be held open.

The invention having been set forth, what is claimed as new and useful is;

In a multiple chamber pneumatic automobile tire, a plurality of substantially annular pneumatic tubes arranged in sequence and at right angles to the travel of the wheel, thereby forming a multiple of chambers, an outer protecting integral hollow casing therefor, a central tube extending through the plurality of tubes, a deflating tube extending through the central tube, a series of valve tubes connecting the multiple chambers with the interior of the central tube, the said valve tubes carrying branch valve tubes having openings and including hollow plunger valves having openings to register with the openings of the branch valve tubes, the branch valve tubes extending into the deflating tube, a valve tube extending from and communicating with the deflating tube and opening to the atmosphere, and a valve tube extending from and communicating with the central tube and opening to the atmosphere.

In testimony whereof we have signed our names to this specification in the presence of two subscribing witnesses.

ARTHUR W. WASHBURN
CHARLES D. KEELER.

Witnesses:
J. W. MOORHEAD,
W. T. WILKINSON.